April 7, 1936.  E. B. ANDERSON  2,036,978
ANTIFRICTION BEARING ASSEMBLY
Filed Aug. 29, 1934
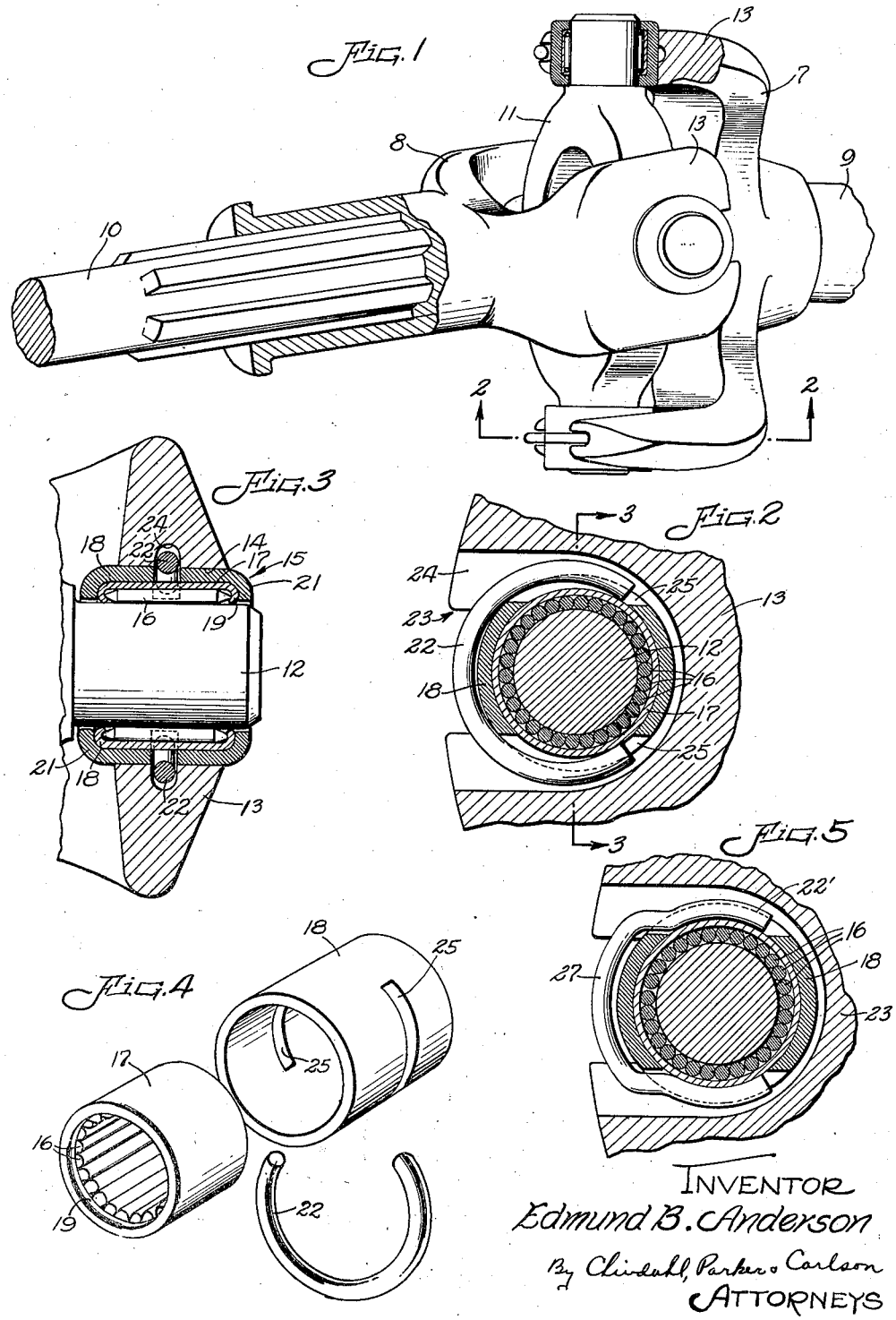

Patented Apr. 7, 1936

2,036,978

UNITED STATES PATENT OFFICE 2,036,978

ANTIFRICTION BEARING ASSEMBLY

Edmund B. Anderson, Rockford, Ill., assignor of one-half to Milton B. Anderson, Rockford, Ill.

Application August 29, 1934, Serial No. 741,927

5 Claims. (Cl. 308—212)

This invention relates to anti-friction bearing structures and more particularly to a unitary bearing assembly having anti-friction elements of the needle roller type.

The primary object of the invention is to provide a new and improved needle roller bearing assembly which is simple and inexpensive in construction, which may be readily removed and placed as a unit in the bearing recess of a supporting part and which possesses a high degree of radial compactness.

The invention also resides in the novel manner in which the needle roller bearing cage is supported to permit of attachment of the same to the supporting structure.

In the accompanying drawing wherein a preferred embodiment of the invention is illustrated:—

Figure 1 is a fragmentary perspective view of a Spicer universal joint equipped with anti-friction bearings in accordance with my invention.

Fig. 2 is a fragmentary sectional view taken in the plane of line 2—2 of Fig. 1.

Fig. 3 is a fragmentary sectional view taken in the plane of line 3—3 of Fig. 2.

Fig. 4 is a perspective view of the several parts of the bearing structure, in detached relation.

Fig. 5 is a view similar to Fig. 2 but showing a modified form of retaining clip employed in fastening the bearing in position.

In the drawing, the invention is shown for purposes of illustration as an anti-friction bearing unit for use in a universal joint of the so-called Spicer type comprising two cast or forged yoke members 7 and 8 respectively secured to shafts 9 and 10 to be connected by the joint in driving relation. 11 designates the spider, of usual construction, carrying radial trunnions 12 spaced 90 degrees apart. Each of the yoke members has integral diametrically opposed arms 13 apertured to receive the trunnions 12.

As usually constructed, the arms 13 are equipped with plain bearings inserted through apertures 14 and constructed to fit the trunnions 12. In carrying out my invention, I provide a unitary anti-friction bearing device, generally designated by the numeral 15, which is capable of being readily applied by insertion in the apertures 14 and around the trunnions 12 and can be designed to occupy no more space than that formerly required by the plain friction bearing ordinarily used.

In the construction of the bearing unit 15, I employ a circumferential series of bearing elements in the form of small rollers or so-called needles 16 adapted to bear against the peripheral surface of the trunnions 12. To mount the rollers in position in the bearing apertures 14 of the yoke arms, I provide a supporting means comprising an inner cylindrical cage 17 and a separately formed outer supporting shell 18. The cage 17 is preferably made of steel and has inwardly bent opposite ends 19 with which the ends of the rollers engage, such ends being pointed for this purpose. In order that the cage may be hardened readily without danger of distortion so as to provide a durable bearing surface for the outer raceway, the peripheral wall of the cage is made thin and of uniform thickness throughout its length.

The outer supporting shell or carrier 18 is in the form of a cylinder or sleeve and preferably is made from relatively soft steel. It has an internal diameter such as to receive snugly the cage 17, and is shaped to engage therewith so as to hold the cage against relative axial movement. For this purpose the sleeve preferably has inturned opposite ends 21 for engaging the inturned ends 19 of the cage to hold the parts firmly against relative axial movement in either direction. The carrier sleeve 18 has an outer diameter corresponding substantially to the internal diameter of the aperture 14 in the yoke arms, the fit being such as to permit it to be inserted into or withdrawn readily from its position in the aperture.

In the manufacture of the device, the rollers 16 are assembled in the completed cage 17, it being possible because of the thinness of the wall of the cage to spring the latter sufficiently for this purpose. Thereupon, the cage is inserted into the carrier sleeve 18, one end only of the latter having been turned inwardly at this time. Finally, the opposite end of the sleeve is bent inwardly, as by a spinning operation, thereby clamping the two parts firmly together, the inturned ends 21 constituting abutments engaging with the inturned ends 19 of the cage. It will be observed in this connection, that the carrier sleeve, because formed separately from the hardened roller cage, may be of relatively soft metal so as to permit of bending one end portion into holding engagement with the cage, a method of fastening the two parts together into a rigid structure, which is at the same time effectual and very simple and inexpensive.

To secure the unit within the aperture 14, any suitable means may be employed. Preferably, I utilize a detachable fastening device engageable with shoulders formed on the yoke arm and on the sleeve 18. Herein the device is a spring clip in the form of a split ring 22. To receive this ring, the yoke arm 13 is cut away at the side of the aperture adjacent the free end of the arm so as to provide an opening 23 of a width somewhat less than the external diameter of the bearing unit. Moreover, the yoke arm is provided with inwardly opening grooves 24 on opposite sides of the opening 23 to receive the ring. Similarly, the carrier sleeve 18 is provided with diametrically opposite slots 25 cut to a substantial depth and defining opposed shoulders with which the ring engages. Thus, when the parts are assembled (Fig. 2), pressure exerted upon the ring in the direction transversely of the axis of the bearing, will cause the ends of the ring to ride over the portions of the cage 17 forming arcuate bottom walls for the slots 25, so that when the ring is pressed into its innermost position, it will be held yieldably but firmly against accidental removal. By the coaction of the ring with the grooves 24, the bearing is held against axial movement.

In Fig. 5, I have shown another form of spring clip 22' for detachably securing the bearing unit in the yoke arm. In this instance, the clip is also generally U-shaped in form and in all substantial respects, performs its function in the same manner as the clip 22. However, the intermediate portion of the clip is shaped to form a hump 27 which, in the operative position of the clip, is spaced from the periphery of the carrier sleeve sufficiently to permit of the convenient insertion of a tool in the removal of the clip. Also by this construction the end portions of the clip may be shaped to engage the sleeve throughout a larger area, it being observed from Fig. 5 that the end portions are curved on a radius corresponding to the curvature of the cage so as to engage snugly with the latter throughout the length of the end portions.

From the foregoing, it will be apparent that I have provided a needle roller bearing assembly possessing a high degree of radial compactness and adapted to be removed and placed as a unit by endwise movement thereof into and out of a bearing recess of narrow radial dimensions between a shaft element and a supporting part. The assembly is thus especially adapted to be mounted in the narrow annular space between the trunnions and yoke arms of Spicer type universal joints. Of primary importance in the attainment of these advantageous results is the provision of the separately formed sleeve which engages the ends of the roller cage proper and through the medium of which the assembly may be fastened in a supporting post without the necessity of machining or otherwise changing the shape of the bearing cage which should be of uniform thickness throughout in order to permit of proper hardening of the raceway without the attendant danger of distortion. Moreover, by virtue of the connection at the ends of the cage and sleeve, the radial dimension of the parts necessary to fasten the unit in the supporting part are kept at a minimum.

Another feature of importance is the construction of the bearing as a unitary device. This renders removal and replacement easy and convenient. Finally, the construction of this unit in a size capable of insertion into the space usually occupied by a plain bearing, makes possible the handling of the devices on the market as separate repair parts or accessories.

I claim as my invention:

1. A unitary needle roller bearing assembly comprising a plurality of needle rollers, a hardened steel cylinder of uniform thickness having an internal surface defining a continuous outer raceway supporting said rollers in parallel relation with the adjacent rollers in rolling contact with each other, a sleeve encircling said cylinder and having at least one of its ends bent around the corresponding end of the cylinder whereby the assembly may be removed and placed as a unit in a supporting part, said sleeve being formed in its outer periphery with a recess for receiving a detachable fastening device by which the assembly may be held against axial movement relative to said part.

2. A unitary needle roller bearing assembly comprising a plurality of needle rollers, a hardened metal cylinder having a thin peripheral wall of uniform thickness, the internal surface of said cylinder defining a continuous outer raceway supporting said rollers in parallel relation with the adjacent rollers in rolling contact with each other, a sleeve snugly encircling said cylinder and having its ends bent around the ends of the cylinder whereby the assembly may be removed and placed as a unit in a supporting part, and means formed on said sleeve for engaging a detachable fastening device by which the assembly may be held against axial movement in said part.

3. A unitary needle roller bearing assembly comprising a plurality of needle rollers, a hardened steel cylinder having a thin peripheral wall of uniform thickness and diameter throughout its length, the internal surface of said cylinder defining a continuous outer raceway supporting said rollers in parallel relation with the adjacent rollers in rolling contact with each other, inturned flanges at opposite ends of said cylinder receiving opposite ends of said rollers, a sleeve snugly encircling the external surface of said cylinder throughout the length of the latter, and means rigid with one end of said sleeve and abutting against the corresponding end of said cylinder to constitute the cylinder, the sleeve and said rollers a unitary bearing assembly which may be removed and placed as a unit in an annular recess of a supporting part.

4. A unitary needle roller bearing assembly comprising a plurality of needle rollers, a hardened steel cylinder having a thin peripheral wall of uniform thickness and diameter throughout its length, the internal surface of said cylinder defining a continuous outer raceway supporting said rollers in parallel relation with the adjacent rollers in rolling contact with each other, inturned flanges integral with opposite ends of said cylinder and receiving opposite ends of said rollers, a sleeve snugly encircling the external surface of said cylinder throughout the length of the latter, and means rigid with the ends of said sleeve and abutting against the ends of said cylinder to constitute the cylinder, the sleeve and said rollers a unitary bearing assembly which by endwise movement may be removed and placed as a unit in an annular recess of a supporting part.

5. A unitary needle roller bearing assembly comprising a plurality of needle rollers, a hardened steel shell of uniform thickness having internal surface defining a continuous outer raceway of uniform diameter throughout its length supporting said rollers in parallel relation with the adjacent rollers in rolling contact with each other, a sleeve snugly encircling said cylinder and having means disposed in abutment with at least one end of said cylinder to retain the latter against axial movement whereby the assembly may be removed and placed as a unit in a supporting part, and means formed on said sleeve intermediate the ends thereof for engaging a fastening device by which the assemby may be held against axial movement in said part.

EDMUND B. ANDERSON.